Dec. 31, 1968   A. B. C. MARSHALL   3,419,837
PULSE TRANSFORMER
Filed Dec. 9, 1964

INVENTOR.
ALEXANDER B. C. MARSHALL
BY
Russell E. Schloff
ATTORNEY

United States Patent Office 3,419,837
Patented Dec. 31, 1968

3,419,837
PULSE TRANSFORMER
Alexander B. C. Marshall, Houston, Tex., assignor to Dresser Industries, Inc., Dallas, Tex., a corporation of Delaware
Filed Dec. 9, 1964, Ser. No. 417,006
3 Claims. (Cl. 336—212)

ABSTRACT OF THE DISCLOSURE

A primary coil is wound upon one layer of soft insulation. A second layer of soft insulation covers the primary coil and several layers of secondary coils are laid upon the second layer of soft insulation, the transformer forming part of a well-bore neutron generator.

This invention relates in general to radioactivity well logging and in particular to a neutron generator which is used to produce a stream of high energy neutrons for use in radioactivity well logging. More particularly, it relates to a transformer component of a neutron generator.

In one form of radioactivity well logging, i.e., neutron logging, the characteristics of the subsurface formations are investigated by measuring artifically induced radiation which results from either a continuous or pulsed bombardment of the subsurface formations with high energy neutrons. An example of this type of neutron logging is described in Arthur H. Youmans U.S. Patent application S.N. 243,230, filed Aug. 23, 1951, now U.S. Patent No. 3,294,972 entitled "Method and Apparatus for Identifying the Elements in the Formation Penetrated by Borehole."

In order to produce high energy neutrons it is necessary to have an artificial source of neutrons. One way to artifically produce high energy neutrons is to utilize the deuterium-tritium reaction in a static atmosphere which produces 14 mev. neutrons. Fearon-Thayer U.S. Patent No. 3,071,690 dated Jan. 1, 1963 and entitled "Well Logging Radiation Sources" discloses such a source of high energy neutrons. A neutron generator utilizing this technique which is capable of being pulsed and is particularly adaptable for well logging purposes is disclosed in Arthur H. Youmans U.S. Patent 2,689,918, dated Sept. 21, 1964, entitled "Static Atmosphere Ion Accelerator for Well Logging."

In order to effectively produce high energy neutrons by the deuterium-tritium reaction it is necessary that the deuterium atoms be accelerated by approximately 125 kv. Accordingly, it can be seen that the neutron generators require a very high voltage. The pulsing circuitry for such a neutron generator also requires a high amplitude, fast rise time, pulse transformer. The requirements for the electronic components of a neutron generator are very stringent. In the first instance a logging tool is relatively small in diameter so that it will pass through the various size openings generally used in oil well completion practices. It has been found that the electronic system has to be packaged in a housing having a two inch inside diameter. Also, logging tools operate under relatively strenuous conditions. They will go from ambient temperature to the temperature of the well which may be as high as 150° C. in a relatively short period of time. Also, though very high voltage is required for the operation of the neutron generator, the voltage available to the logging tool is relatively small due to the low power carrying capabilities of the cable; therefore, there is usually a minimum power available. The various electronic circuits of a neutron generator require several transformers. In addition to having stringent operating characteristics required by the environmental conditions of well logging operations, the electrical requirements are also stringent. For example, one such transformer requires a rise time of less than 5 microseconds to put out a pulse having a width of 30 microseconds and operation at 5 kv. Also, this transformer has to work against a complex load approximately equal to a capacity of 200 micro-micro-farads. As can be seen from the foregoing, not only are the electrical requirements of the required transformers stringent but in addition there are very difficult limitations and restrictions required by operational environmental characteristics. Accordingly, ordinary transformers available would not meet the electrical requirements and at the same time satisfy the operational restrictions. However, the transformer of the present invention meets both the electrical requirements and satisfies the operational restrictions.

As can be seen from the foregoing electrical requirements, the transformer requires a relatively fast rise time. The rise time of a transformer is mostly determined by the high frequency cut-off which in turn is determined by the interaction between leakage induction and interturn capacitance. As is well known in the transformer art, there is capacitance created between each turn of wire. This capacitance is generally known as "interturn capacitance" and is particularly high if the turns of the transformer coil are parallel to each other. Most common transformers have parallel wound coils in order to prevent crosses which are generally considered undesirable. There is a technique known as universal winding in which although the turns in each layer are parallel to one another, each subsequent layer is angularly disposed to the layer underneath. The universal winding technique is utilized to reduce interturn capacitance. However, while the universal winding technique does reduce interturn capacitance to some extent, it results in a transformer of considerably larger size than the conventionally parallel wound coil, particularly if it is required to carry high voltage. In an effort to substantially decrease the interturn capacitance and consequently the rise time, other techniques of winding transformers have been utilized. One such other technique is forming a series of universally wound pie shaped coils. However, such techniques generally result in extremely large transformers, particularly in the case where high voltage is being applied to the transformer. Accordingly, it is an object of the present invention to provide a high amplitude, fast rise time, electrical pulse transformer that is relatively small in size and has an exceedingly fast rise time.

Another object is to provide a transformer which will provide exceedingly fast rise time and carry relatively high voltage without appreciably increasing the size of the transformer.

It is a further object to provide a high amplitude, fast rise time transformer which will operate over a wide temperature range and will be virtually unaffected by temperatures up to 150° C.

It is still a further object to provide a high amplitude, high temperature, fast rise time transformer which has a high degree of reliability and long life.

One further object is to provide a method of manufacturing a transformer having a high amplitude, fast rise time.

The novel transformer of the present invention is comprised of a layer of soft insulation about which is wound a primary coil. A second layer of soft insulation is then positioned about the primary coil and a secondary coil is wound in a multi-layered manner about the second layer of insulation. The single layer of the primary coil and each layer of the secondary coil is wound in a random manner with a multiplicity of crosses. A layer of insulation tape is positioned at each edge of the soft insulation material and a layer of insulation material is positioned between each layer of the secondary coil. The layer of insulation material between each layer of the secondary coil covers a portion of the insulation tape at the edge. The insulation tape is formed of material which has the property of molecular adhesion and forms in effect a monolithic block of edge insulation. Two pair of C shaped laminated elements form the core for the transformer. One leg of each element is inserted through the opening in the coils and the assembled core is of such dimension that the coils float on the core.

The method of constructing the improved high amplitude, fast rise time transformer is generally comprised of the following steps:

A piece of relatively soft insulation is placed about a winding mandril. Several turns of a soft insulation tape are positioned on each end of the insulation. A layer of transformer coil wire is wound in a random manner about the insulation. The random winding is such that a multiplicity of crossovers is formed between turns. This layer forms the primary coil for the transformer. A second layer of insulation is placed on top of the primary coil and the secondary coil is then wound about the second layer of insulation. Again, a layer of insulation tape is placed on each end of the second layer of insulation. The secondary coil is wound in a multilayered fashion with the secondary coil being divided into a multiplicity of cells. On top of each cell is a layer of insulating material positioned so as to cover a portion of the edge insulating tape. Upon completion of the secondary coil, a third layer of insulation may be placed about the periphery of the secondary coil. The coil element is then removed from the mandril. The core is formed with two pair of C-shaped elements; one leg of each element is positioned in the opening in the center of the coils.

Although random winding by presenting a multiplicity of crossovers cuts down the interturn capacitance of the coil, it is usually considered very poor for reliability inasmuch as there can be a leak between crossed wires. This has been solved by utilizing a wire having a hard ceramic covering impregnated with Teflon. By dividing the secondary coil into a plurality of cells, the voltage in each cell is limited so that insulation breakdown due to high voltage does not occur. Also, the hard ceramic covering prevents cold flow and break down of insulation due to crossovers. In addition, the stresses at crosses normally resulting from expansion and contraction are reduced since the entire core is formed of soft material and therefore differential expansion and contraction is substantially reduced. It has been found that by utilizing insulating tape having molecular adhesion properties on the edges of the coil there results a monolithic block of insulation which, plus the fact that there is a layer of insulating material between each cell, prevents the forming of any long leakage path. Therefore, since the insulation of the wire used in the winding is sufficient to withstand the voltage in any one particular cell, there is no tendency for a breakdown in this manner and in addition, the arcing resulting from a long leakage path is also eliminated.

Accordingly, it is a further object to form a coil for a transformer in which a secondary coil is formed of a multiplicity of cells having a layer of insulation material between each cell and a monolithic block of insulation at each end so that leakage paths between cells are minimized.

It is still a further object to wind the secondary coil of a transformer in a random manner so as to reduce the interturn capacity, thereby decreasing the rise time of the transformer.

It is another object to divide the secondary coil of a transformer into a plurality of individual cells thereby reducing the voltage across any one cell to reduce the possibility of breakdown in insulation of the winding forming the coil.

It is still a further object to form a primary and secondary coil insulation for a transformer of all soft materials so that even though the secondary coil is wound in a random manner having a multitude of crosses, the stresses at the crosses will be relieved.

Other objects and objects relating to details of construction and manufacture will be apparent to those skilled in the art from the detailed description which is about to follow in which.

Figure 1:
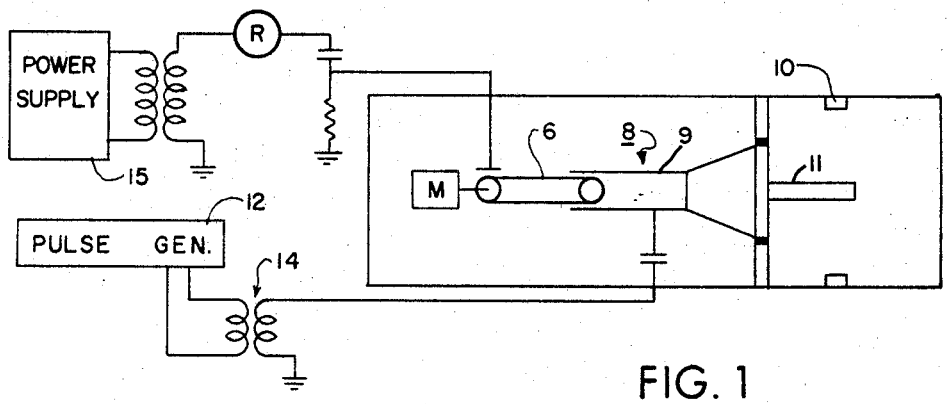
FIG. 1 is a diagrammatic schematic view of a pulse generator.

Referring now in greater detail to the drawings and in particular to FIG. 1, it can be seen that a neutron generator is comprised of a Van de Graff high voltage electrostatic generator 6 which produces a voltage of about 125 kv. for application to an ion accelerator tube 8 to generate a flow of high energy deuterium ions toward a tritium target 10. The interaction between the deuterium ions and the tritium target produces 14.2 mev. neutrons. The neutron generator may be operated continuously or may be pulsed by incorporation of a pulsing electrode 9 which surrounds the high voltage terminal 11 of the acceleration tube 8. The target 1000 also surrounds a portion of the high voltage terminal 11 of the tube 8 as is well known in the art. Pulses generated by a pulse generator 12 are transferred by a pulse transformer 14 to the pulsing electrode. The transformer 14 is required to deliver a 5 kv. pulse having a pulse width of 30 microseconds with a rise time of less than 5 microseconds to the pulsing electrode. The transformer 14 operates at a repetition rate of 1,000 times per second. The power supply circuit for the Van de Graff generator 6 utilized a high voltage step up power transformer 15 which also operates with a fast rise time.

As mentioned in the introduction, the neutron generator is particularly useful for operations in a well logging tool (not shown) and the electronic units have to be packaged within a space having an inside diameter of approximately two and one-half inches. Logging tools operate in a hostile environment and are subject to high pressures and temperature changes which may range from ambient temperature to 150° C. in hot wells in a relatively short period of time.

Figure 2:
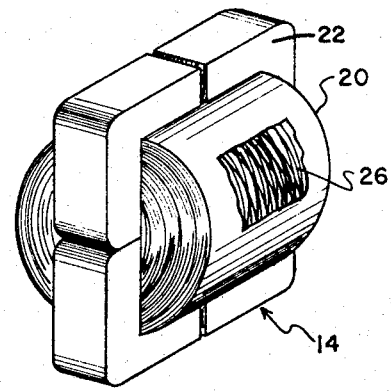
FIG. 2 is an isometric view of a transformer that can be utilized in the pulse generator.

In FIGURE 2, the transformer 14 is formed of a coil portion 20 and a core portion 22. The coil portion 20 is formed of a primary coil 24 and a multi-layered secondary coil 26, illustrated in FIGURES 3 and 4. The primary coil 24 is wound around insulation 28 which is formed of one turn of a relatively soft transformer insulating material such as Isomica. The winding of the primary coil is wound in a random fashion which results in a multitude of crossovers with parallel turns being avoided as much as possible. At the edges of the insulation 28 there are several layers of insulating tape 30 which have the property of molecular adhesion. One tape which had worked very satisfactorily is unsintered Teflon polytetrafluoroethylene tape. After the primary coil 24 has been wound with approximately 75 turns, a second layer of insulation 32 is placed about the primary coil 24. This layer of insulation may also be Isomica or any other soft transformer insulation material. The secondary coil 26 is wound about the second layer of insulation 32. The secondary coil 26 is divided into a plurality of cells 33. In one form of the transformer, fifteen cells are utilized with each cell having approximately 200 turns, thus resulting in a primary to secondary turns ratio of approximately 1:40. The secondary coil 26, like the primary coil 24, is randomly wound and again a mutlitude of crososvers appear and parallel turns will be avoided wherever possible. Along the edges of the second layer of insulation 32 insulating tape 30 is again placed; as previously mentioned it should be an insulating material which has the property of molecular adhesion. Between each cell 34 there is a layer of insulating material 36. This insulating material extends over the top of the cell 33 of the secondary coil 26 and partially over the edge insulating tape 30. The insulating material 36 may be formed of any good transformer insulating material. One which has been found particularly useful has been sintered Teflon polytetrafluoroethylene tape which has an adhesive on one side. The reason for using sintered rather than unsintered Teflon polytetrafluoroethylene tape is that it will not as readily cold flow and therefore will retain its insulating properties. The construction of the secondary coil continues until the secondary coil 26 is completed. About the outer periphery of the secondary coil a third layer of insulation 38 may be placed.

Since a random wound construction is used in forming the coils it is necessary to use a good grade of transformer wire having a relatively hard exterior insulation. One wire which has been found satisfactory for this purpose has been a ceramic covered wire which has been impregnated with Teflon polytetrafluoroethylene. The ceramic covering again being hard does not have a tendency to cold flow and the impregnation of the Teflon polytetrafluoroethylene prevents electronic leakage. By making a cellular secondary coil the voltage in each cell is relatively small and therefore there is less tendency to have breakdown in the wire and an arc from one end through the other end of the cell. The Teflon polytetrafluoroethylene insulating tape on the edges having a molecular adhesion action forms in effect a monolithic block of insulation which fully insulates each cell 33 from its adjacent cell. Having such monolithic block of insulation results in long leakage paths in a small space. This eliminates the necessity of the pressurized gas insulation for the transformer; yet it has been found to make the transformer very reliable.

By using a random wound construction, the interturn capacity of the coil is markedly reduced which in effect permits a higher upper frequency cut-off and therefore decreases the rise time of the transformer. Although the random winding cuts down on the interturn capacitance, it results in a multitude of crossed wires and this is usually very poor for reliability. The reliability aspect was solved by using the hard ceramic covered wire and also forming the coil on soft insulation which permits expansion and contraction due to the heat without greatly stressing crossover points.

Figure 3:
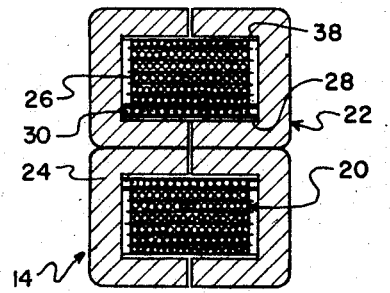
FIG. 3 is a vertical section view through the transformer shown in FIG. 2.
Figure 4:
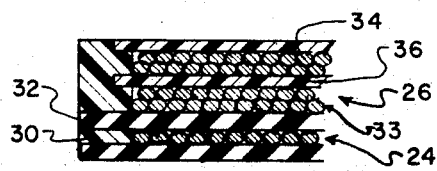
FIG. 4 is an elongated sectional view of an end portion of the secondary coil.

One other aspect which affects the rise time of the transformer is leakage induction. The present transformer uses a laminated core construction which has considerably reduced leakage induction. In an effort to also increase the rise time, as can be seen in FIG. 2 and FIG. 3, the core 22 is formed of four C-shaped elements, each of which have one leg positioned through the opening in the coil 20 to form a core which completely surrounds the coil.

As previously mentioned, all materials going into the construction of the coil insulation are relatively soft and being relatively soft, the coil has an opportunity to expand and contract with reduced formation of stress points which would tend to cause difficulty at the multitude of crosses in the random wound construction. Also the core 22 is so construtced that the portion which is telescoped through the coil opening does not make a tight fit with the inside of the coil, see FIG. 2. Instead, when the C-shaped elements are brought together in contact, the portion of the core elements which contact the ends of the coil squeeze slightly into the end insulation; this action causes the coil to float on the core and tends to aid in relieving stresses.

As can be seen in the foregoing, the present invention discloses a high amplitude, fast rise time transformer which is capable of rigid electrical requirements to perform with either a high voltage power transformer, or a high voltage pulse transformr. At the same time the transformer is capable of meeting severe environmental requirements. It has been so designed that the size of the transformer is very small in relation to its electrical characteristics and at the same time it has been designed so as to operate over a relatively large temperature range which extends from ambient temperature to 150° C.

By utilizing a random wound coil, the interturn capacity of the coil has been substantially reduced, thereby increasing the upper frequency cut-off and decreasing the rise time resulting in a transformer having a relatively fast rise time. Even though the coil has been formed of random wound construction, by utilizing transformer wire having a hard ceramic covering and all other materials being relatively soft and having the coil float on the core, the multitude of crossovers will still not cause burnouts because the stress points have been minimized. In addition, the secondary coil has been divided into a multitude of cells thereby dividing the high voltage which normally would be generated in a secondary coil to a relatively lower voltage which is within the capabilities of the insulation of the winding wire that is used. Accordingly, in order to provide the cellular construction for the secondary coil each of the cells is provided with a layer of insulation and the edges of the coil have been formed into a monolithic block of insulation by the utilization of an insulating tape having the property of molecular adhesion.

I claim:
1. A high amplitude, fast rise time transformer comprising:
   a first layer of soft insulation, a primary coil wound about said layer of insulation, a second layer of insulation surrounding the primary coil, a secondary coil formed of transformer wire having a ceramic covering impregnated with polytetrafluoroethylene wound in a multi-layered manner about said second layer of insulation;
   the turns of said primary and secondary coils being a ratio of 1:40 with the primary containing approximately 75 turns and the secondary containing 15 layers of approximately 200 turns each,
      each layer being wound in a random manner with a multiplicity of crosses,
      a layer of insulation tape at the edge of each layer of turns including the primary coil, the insulation tape being formed of a material capable of molecular adhesion so that the insulation tape at each edge in effect forms a monolithic block of insulation,
      a layer of insulation material between each layer of turns covering a portion of the insulation tape at the edges, the insulation material being formed of material having high dielectric characteristics, high temperature and structural characteristics;
   a third layer of soft insulation about the secondary coil;
   two pair of C-shaped laminated elements forming the core for the transformer, one leg of each element being inserted through the opening in the coils, the assembled core being such that the coils float on the core.

2. A high amplitude, fast rise time transformer comprising:
   a first layer of soft insulation,
   a primary coil formed of transformer wire having a ceramic covering impregnated with polytetrafluoroethylene wound about said layer of insulation,
   a second layer of insulation surrounding the primary coil,
   a secondary coil formed of transformer wire having a ceramic covering impregnated with polytetrafluoroethylene wound in a multi-layered manner about said second layer of insulation;

each layer being wound in a random manner with a multiplicity of crosses, a layer of insulation tape at the edge of each layer of turns including the primary coil, the insulation tape being formed of a material capable of molecular adhesion so that the insulation tape at each edge in effect forms a monolithic block of insulation, a layer of insulation material between each layer of turns covering a portion of the insulation tape at the edges, the insulation material being formed of material having high dielectric characteristics, high temperature and structural characteristics;

two pair of C-shaped laminated elements forming the core for the transformer, one leg of each element being inserted through the opening in the coils, the assembled core being such that the coils float on the core.

3. A high amplitude, fast rise time transformer comprising:

a first layer of soft insulation,
a primary coil wound about said layer of insulation,
a second layer of insulation surrounding the primary coil,
a secondary coil wound in a multi-layered manner about said second layer of insulation;
each layer of said secondary coil being wound in a random manner with a multiplicity of crosses, a layer of insulation tape at the edge of each wound layer of turns including the primary coil, the insulation tape being formed of a material capable of molecular adhesion so that the insulation tape at each edge in effect forms a monolithic block of insulation, a layer of insulation material between each layer of turns covering a portion of the insulation tape at the edge forming each layer of secondary turns into cells;

a core surrounding said coils.

References Cited

UNITED STATES PATENTS

| | | | |
|---|---|---|---|
| 3,159,907 | 12/1964 | Bloom | 336—209 X |
| 1,450,362 | 4/1923 | Gilinson | 336—206 |
| 2,988,642 | 6/1961 | Soloway | 250—84 |
| 3,028,568 | 4/1962 | Camilli | 336—206 |
| 3,040,281 | 6/1962 | Morisuye | 336—206 |
| 3,201,731 | 8/1965 | Baenziger et al. | 336—212 |
| 3,212,172 | 10/1965 | Davis | 336—190 |

LEWIS H. MYERS, *Primary Examiner.*

ELLIOT A. GOLDBERG, *Assistant Examiner.*

U.S. Cl. X.R.

336—178, 190, 206, 209